United States Patent
Kojima et al.

(10) Patent No.: US 6,798,196 B2
(45) Date of Patent: Sep. 28, 2004

(54) SLIDING SEAT POSITION DETECTION SYSTEM

(75) Inventors: Mikihito Kojima, Saitama (JP); Toyohiko Shindo, Saitama (JP); Makoto Nagai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/384,363

(22) Filed: Mar. 7, 2003

(65) Prior Publication Data

US 2004/0004474 A1 Jan. 8, 2004

(30) Foreign Application Priority Data

Mar. 15, 2002 (JP) ........................................ 2002-071400

(51) Int. Cl.⁷ ................................................. G01B 7/14
(52) U.S. Cl. ................................................. 324/207.26
(58) Field of Search ........................ 324/207.22, 207.24, 324/207.26; 280/727, 735; 248/429

(56) References Cited

U.S. PATENT DOCUMENTS 6,053,529 A 4/2000 Frusti et al.
6,593,735 B2 * 7/2003 Becker .................. 324/207.26

* cited by examiner

*Primary Examiner*—Bot Ledynh
(74) *Attorney, Agent, or Firm*—Carrier, Blackman & Associates, P.C.; Joseph P. Carrier; William D. Blackman

(57) ABSTRACT

A sliding seat position detection system includes a sensor provided on a seat that can slide on a floor of a vehicle, and a magnetic shielding member provided on the floor. The detection system detects that the seat is at a front end position when the shielding member provides a shield between a permanent magnet and a magnetism detection part of the sensor. A non-magnetic cover member is attached to the shielding member. When the seat is at a position other than the front end position, the cover member is positioned between the permanent magnet and the magnetism detection part of the sensor, thereby preventing erroneous detection due to magnetic foreign matter and other magnetic substances caught in or attached to the sensor.

6 Claims, 6 Drawing Sheets

SLIDING SEAT POSITION DETECTION SYSTEM

BACKGROUND OF THE INVENTION

1. Technical Field of the Invention

The present invention relates to a sliding seat position detection system that includes a sensor provided on a seat that can slide on a floor of a vehicle, and a magnetic body provided on the floor, the detection system detecting that the seat is at a predetermined position when the magnetic body is positioned beside the sensor as the seat slides.

2. Discussion of Relevant Art

Such a sliding seat position detection system is known from U.S. Pat. No. 6,053,529. This sliding seat position detection system is used in order to control the operation of an airbag system, etc. according to the fore-and-aft position of a seat, and the position of the seat is magnetically detected according to the relative position between a sensor provided on the seat and a magnetic flange provided on the vehicle floor.

In the above-mentioned conventional detection system, the flange is positioned beside the sensor when the seat moves forward, and the flange is positioned away from the sensor when the seat moves backward. Therefore, the sensor is exposed when the seat is at the forward position, and in some cases foreign matter gets caught in or attached to the sensor. If the foreign matter is magnetic, there is a possibility that the sensor misidentifies the foreign matter as the flange and erroneously detects the position of the seat.

The present invention has been achieved in view of the above circumstances, and it is an object of the present invention to provide a sliding seat position detection system that can prevent erroneous detection due to foreign matter caught in or attached to a sensor.

SUMMARY OF THE INVENTION

In order to achieve the above object, in accordance with a first aspect of the present invention, there is provided a sliding seat position detection system that includes a sensor provided on a seat that can slide on a floor of a vehicle, and a magnetic body provided on the floor, the detection system detecting that the seat is at a predetermined position when the magnetic body is positioned beside the sensor as the seat slides, wherein the detection system further includes a non-magnetic body that is connected to the magnetic body, the non-magnetic body being positioned beside the sensor when the seat is at a position other than the predetermined position.

In accordance with this arrangement, the magnetic body is positioned beside the sensor when the seat is at the predetermined position that is to be detected, and the non-magnetic body is positioned beside the sensor when the seat is at a position other than the predetermined position that is to be detected. Therefore, the sensor is always covered with either the magnetic body or the non-magnetic body, thereby preventing erroneous detection due to foreign matter caught in or attached to the sensor.

A shielding member 23 and a target detection member 23' in the disclosed embodiments correspond to the magnetic body of the present invention; a cover member 24 of the embodiments corresponds to the non-magnetic body in the present invention; and a magnetic sensor 27 and a magnetic body sensor 27' of the embodiments correspond to the sensor of the present invention.

Modes for carrying out the present invention are explained below by reference to embodiments of the present invention shown in the attached drawings.

BRIEF DESCRIPTION OF THE DRAWINGS

FIG. 1 is a perspective view of a front part of a passenger compartment of an automobile with components of the sliding seat position detection system shown in broken lines.

FIG. 2 is a magnified view of area 2 in FIG. 1.

FIG. 3 is a magnified view of area 3 in FIG. 2.

FIG. 4 is a cross section along line 4—4 in FIG. 2.

FIG. 5 is a cross section along line 5—5 in FIG. 2.

DETAILED DESCRIPTION OF THE INVENTION

Figure 1:
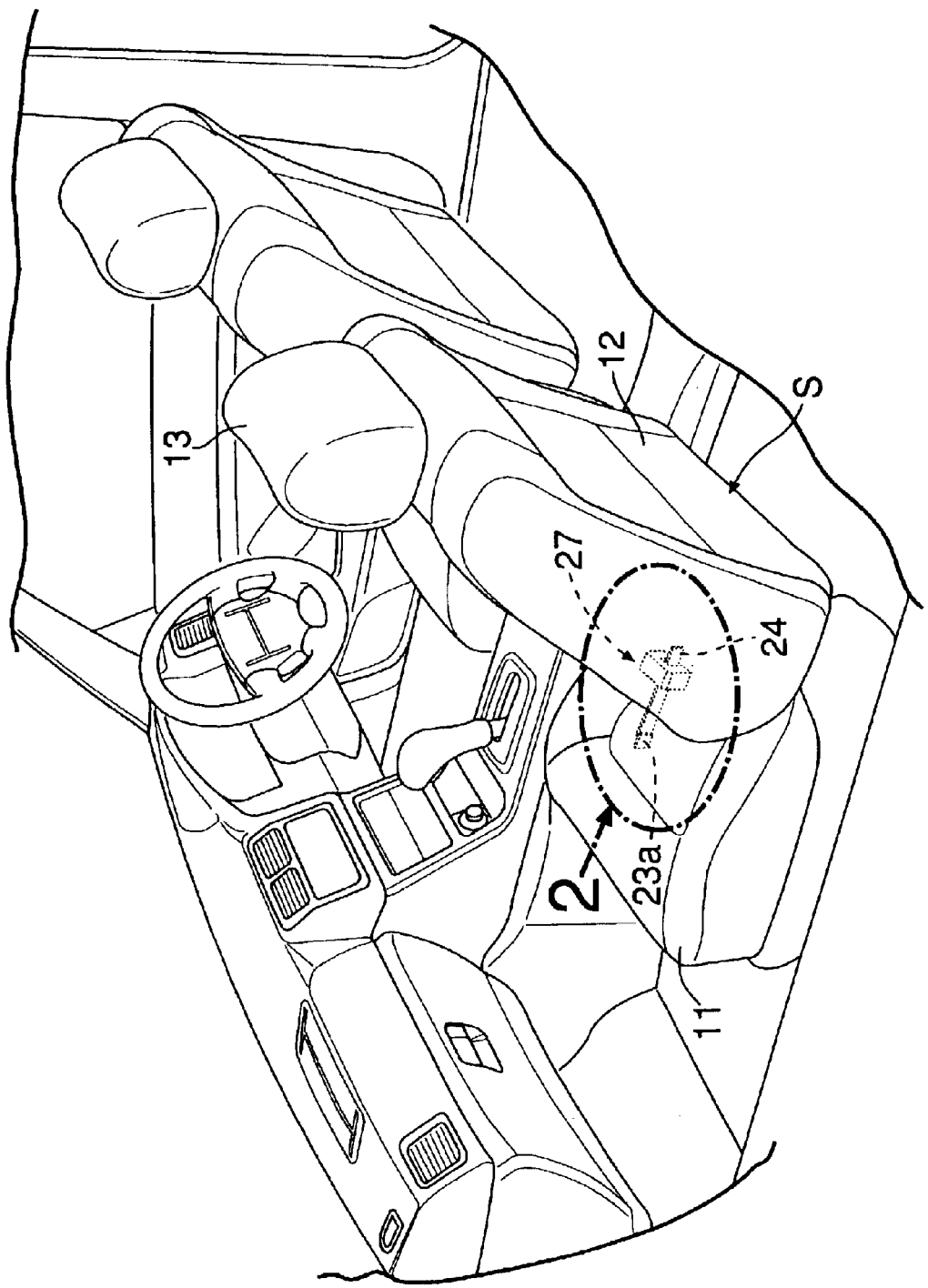
FIGS. 1 to 5 illustrate a first embodiment of the present invention.
Figure 2:
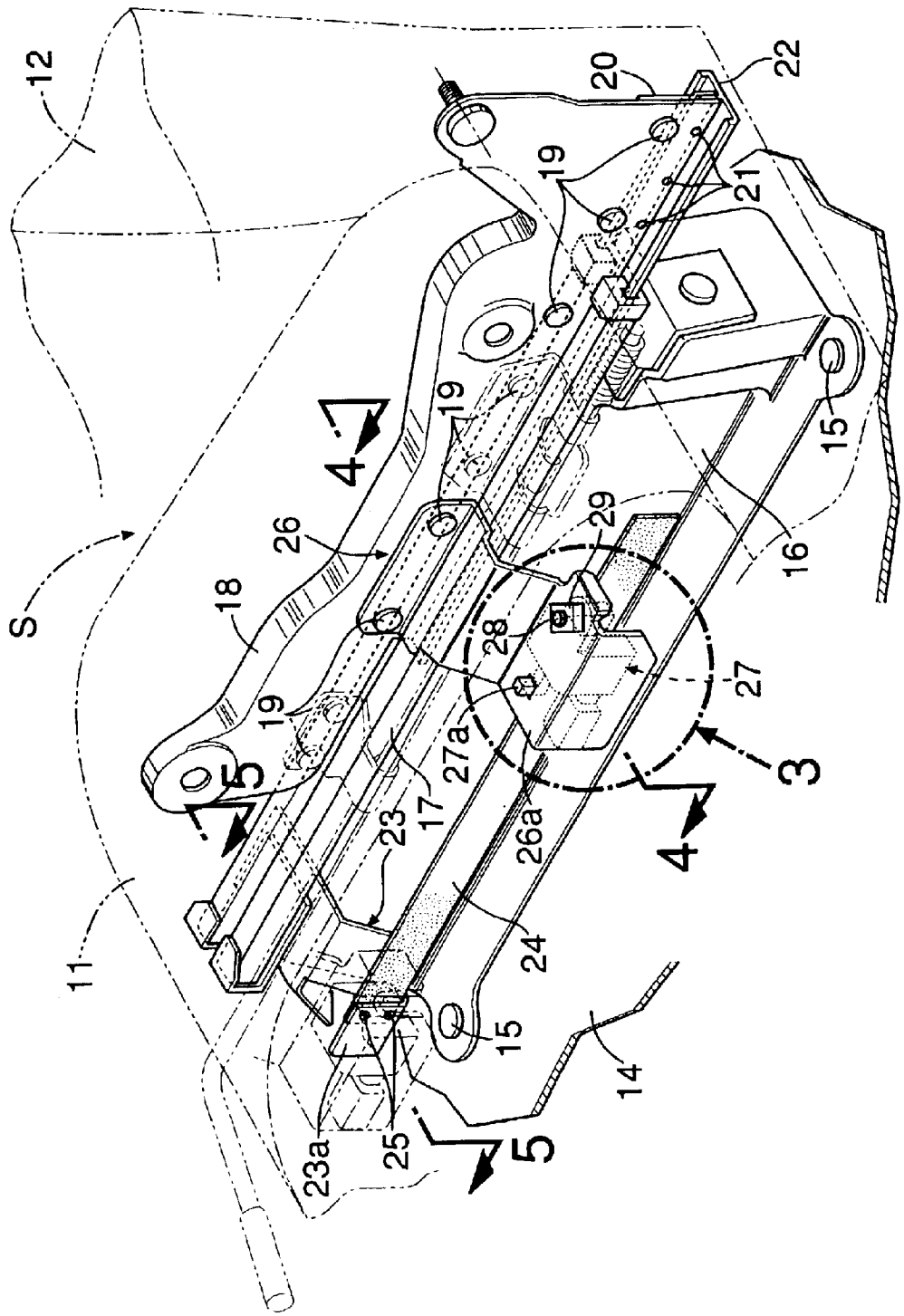

As shown in FIGS. 1 and 2, a front passenger seat S of an automobile includes a seat cushion 11, a seat back 12, and a headrest 13. A pair of left and right seat rails 17 are welded to an upper face of a pair of left and right base members 16 that are fixed to a floor 14 by means of rivets 15. A pair of seat frames 18 are fixed to opposite sides on the left and right of the seat cushion 11, and supported on the seat rails 17 in a longitudinally slidable manner. The base member 16, the seat rail 17, and the seat frame 18 on the left side and the base member 16, the seat rail 17, and the seat frame 18 on the right side have a substantially bilaterally symmetrical structure. Therefore, FIG. 2 illustrates only the base member 16, the seat rail 17, and the seat frame 18 on the right side.

Figure 3:
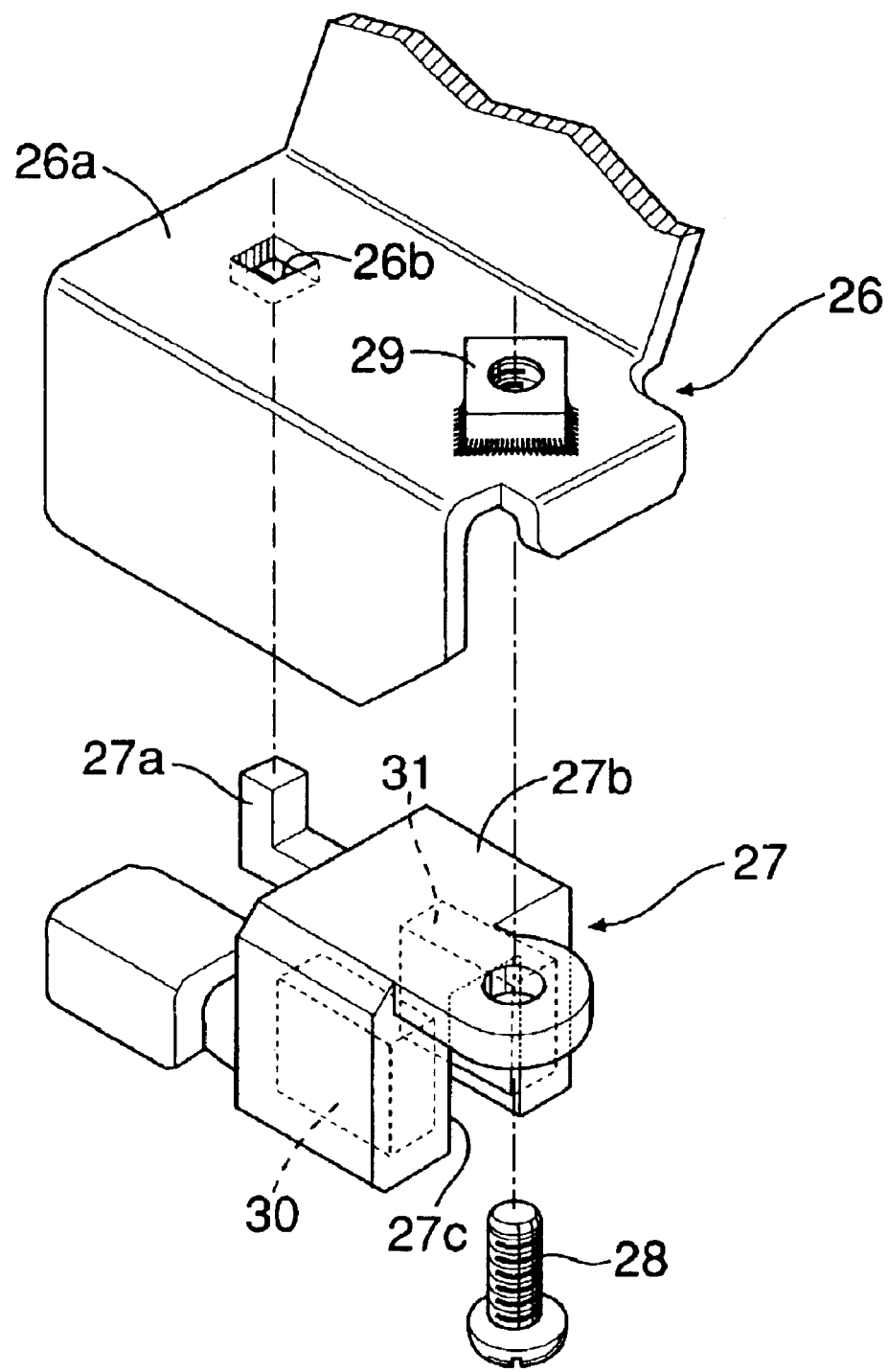
Figure 4:
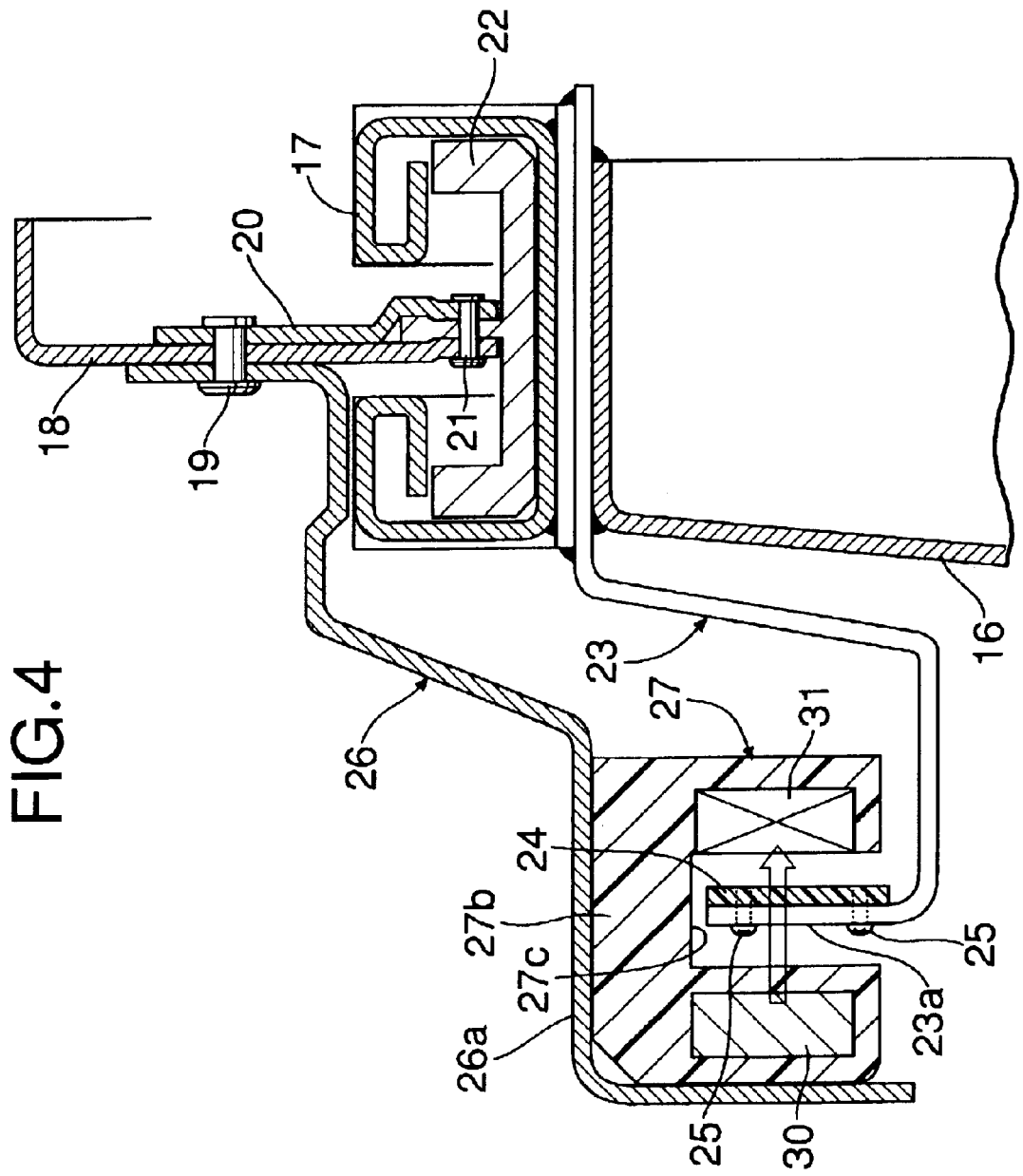
Figure 5:
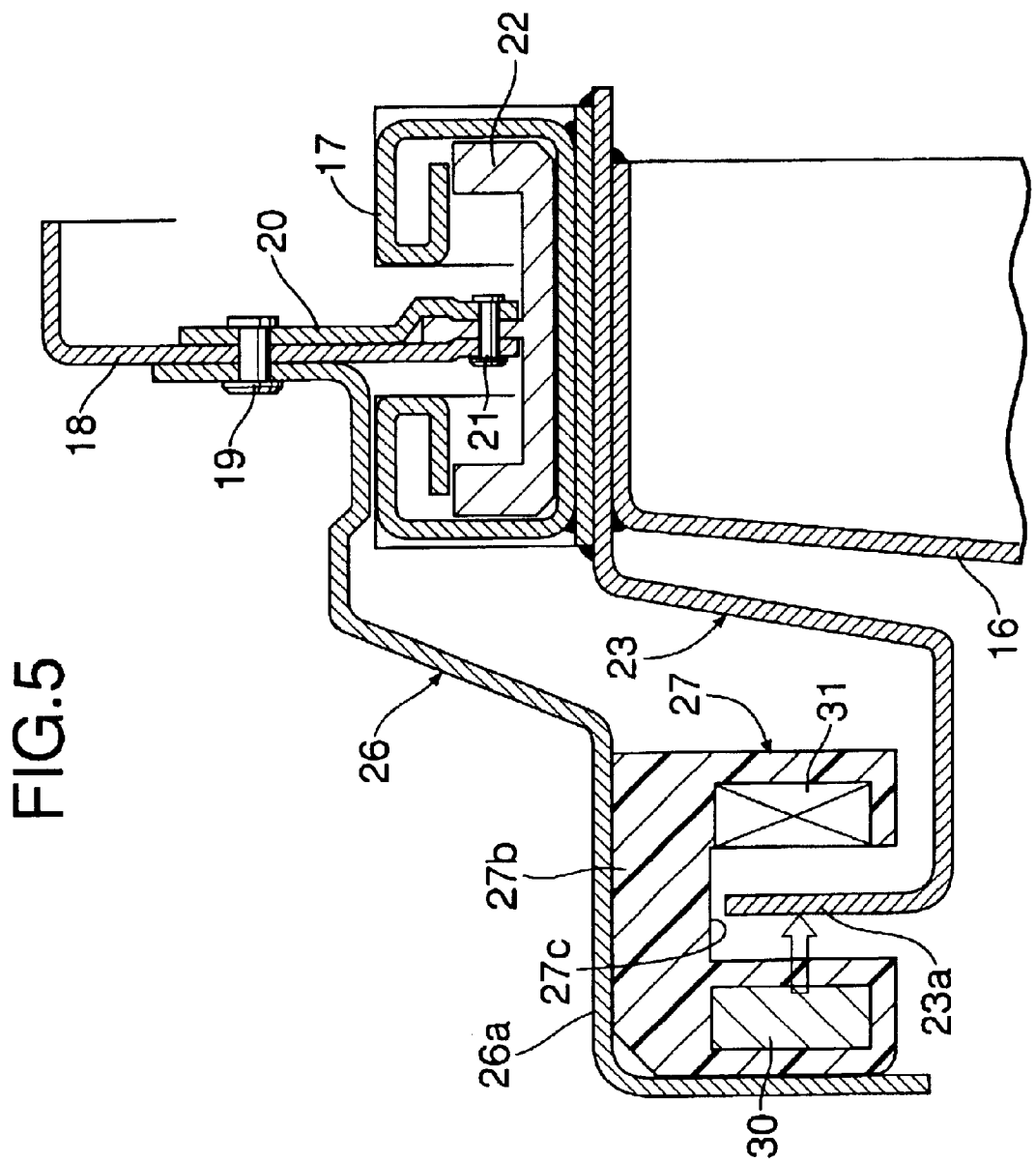

As is clear from reference also to FIGS. 3 to 5, the seat rail 17 is formed from a member having a C-shaped section opening upward. A support plate 20 is fixed to the lower edge of the plate-like seat frame 18 by means of rivets 19. A slider 22 is clamped between the seat frame 18 and the support plate 20, fixed by means of rivets 21, and slidably fitted within the seat rail 17. A shielding member 23 made of a magnetic material (e.g., iron) is welded between a lower face of the front end of the seat rail 17 and an upper face of the front end of the base member 16. The shielding member 23 has a vertically extending shielding portion 23a at the extremity that is bent into a U-shape. Fixed to the shielding portion 23a of the shielding member 23 by means of bolts 25 is the front end of a strip-shaped cover member 24 made of a non-magnetic material (e.g., a synthetic resin). The cover member 24 extends longitudinally along a side wall of the base member 16.

A stay 26 is fixed by means of the rivets 19 to a longitudinally middle section of the seat frame 18. A magnetic sensor 27 is fixed by means of a bolt 28 and a nut 29 to a sensor support portion 26a at the extremity of the stay 26. Engaging a positioning projection 27a, which is projectingly provided on the magnetic sensor 27, in a positioning hole 26b formed in the sensor support portion 26a can prevent the magnetic sensor 27 from rotating. A main body portion 27b of the magnetic sensor 27 has a U-shaped section opening downward, the main body portion 27b being formed from a non-magnetic material such as a synthetic resin. A permanent magnet 30 is fixed to one side of the main body portion 27b, a Hall IC magnetism detection part 31 is fixed to the other side, so that the two sides form a channel 27c therebetween.

Thus, the seat S slides longitudinally while the sliders 22 fixed to the seat frames 18 are guided along the seat rails 17 fixed to the floor 14. When the seat S reaches the front end position, the shielding portion 23a of the shielding member 23 enters the channel 27c of the main body portion 27b of the magnetic sensor 27 so as to provide a shield between the permanent magnet 30 and the magnetism detection part 31. As a result, lines of magnetic force from the permanent magnet 30 are prevented from reaching the magnetism detection part 31, so that it is detected that the seat S is at the front end position (see FIG. 5).

When the seat S slides rearward from the front end position, since the shielding portion 23a moves away from the channel 27c of the main body portion 27b of the magnetic sensor 27, lines of magnetic force from the permanent magnet 30 reach the magnetism detection part 31, so that it is detected that the seat S is not in the front end position (see FIG. 4). At this time, instead of the shielding portion 23a, the cover 24 enters the channel 27c so as to provide a shield between the permanent magnet 30 and the magnetism detection part 31. However, since lines of magnetic force can penetrate the cover member 24, which is made of a non-magnetic synthetic resin, the detection performance of the magnetic sensor 27 is not affected.

When the seat S is not in the front end position, if magnetic foreign matter is caught between or attached to the permanent magnet 30 and the magnetism detection part 31 of the magnetic sensor 27, there is a possibility that the foreign matter might be misidentified as the magnetic shielding portion 23a, leading to erroneous detection that the seat S is at the front end position. However, in accordance with the present embodiment, regardless of the position of the seat S within the sliding range, at least one of the shielding portion 23a and the cover member 24 is present in the channel 27c of the main body portion 27b of the magnetic sensor 27. When disposed in the channel 27c, the shielding portion 23a and the cover member 24 are positioned beside and facing the magnetic sensor 27 with a narrow gap therebetween small enough to restrict or prevent most foreign matter from entering. As a result, the shielding portion 23a or the cover member 24 can prevent magnetic foreign matter from getting caught in or attached to the channel 27c, thereby avoiding erroneous detection.

Figure 6:
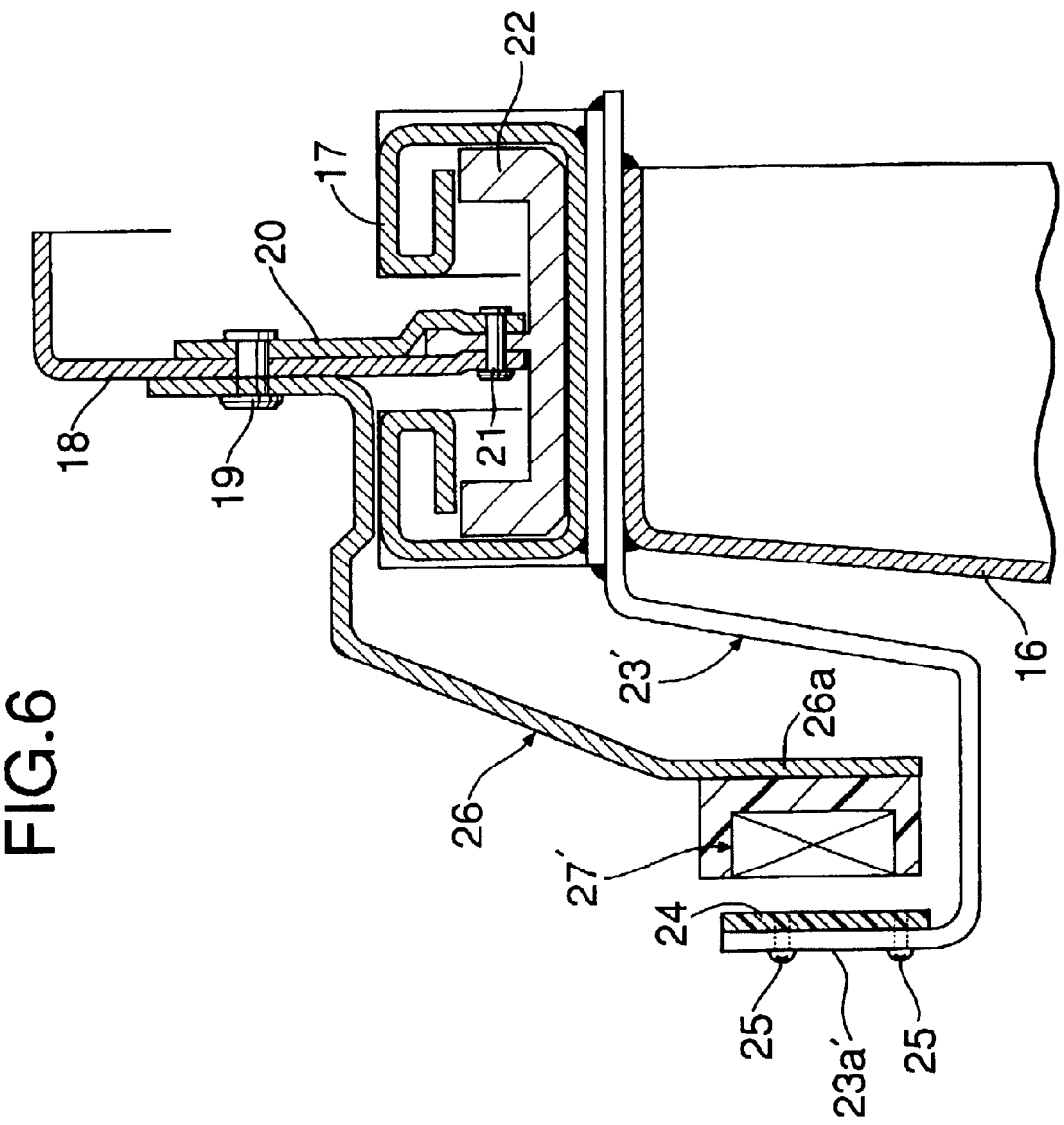
FIG. 6 illustrates a second embodiment of the present invention, and is particularly a view corresponding to FIG. 4 of the first embodiment.

The second embodiment of the present invention is now explained by reference to FIG. 6.

The magnetic sensor 27 of the first embodiment detects lines of magnetic force from the permanent magnet 30 by means of the magnetism detection part 31, but the second embodiment includes, instead of the magnetic sensor 27, a magnetic body sensor 27' that detects the proximity of a magnetic body, and also includes a target detection member 23' and a cover member 24. The target detection member 23' and the cover member 24 are the same members as the shielding member 23 and the cover member 24 of the first embodiment.

When a seat S reaches the front end position, a target detection portion 23a' at the extremity of the target detection member 23', which is made of a magnetic material (e.g., iron), is positioned beside the magnetic body sensor 27', so that it is detected that the seat S is at the front end position. When the seat S is at a position other than the front end position, the cover member 24 is positioned beside the magnetic body sensor 27'. However, since the cover member 24 is made of a non-magnetic material (e.g., a synthetic resin), it is not detected by the magnetic body sensor 27'.

Regardless of the position of the seat S within the sliding range, at least one of the target detection portion 23a' and the cover member 24 is positioned beside the magnetic body sensor 27'. As a result, again, the target detection portion 23a' or the cover member 24 can prevent magnetic foreign matter from getting attached to the magnetic body sensor 27', thereby avoiding erroneous detection similar to the first embodiment.

Embodiments of the present invention have been described in detail above, but the present invention can be modified in a variety of ways without departing from the scope of the present invention.

For example, in the embodiments, the shielding member 23 and the target detection member 23' are made of iron, but any other magnetic material can also be employed.

Furthermore, in the embodiments, the cover member 24 is made of a synthetic resin, but any other non-magnetic material can also be employed.

Moreover, in the embodiments, the front end position of the seat S is detected, but it is also possible to detect the rear end position or a middle position of the seat S.

As described above, in accordance with the present invention, the magnetic body is positioned beside the sensor when the seat is at the predetermined position that is to be detected, and the non-magnetic body is positioned beside the sensor when the seat is at a position other than the predetermined position that is to be detected. Therefore, the sensor is always covered with either the magnetic body or the non-magnetic body, which prevents the sensor from being exposed to foreign matter at all times, thereby preventing erroneous detection due to foreign matter caught in or attached to the sensor.

We claim:

1. A sliding seat position detection system comprising:
    a sensor provided on a seat that can slide on a floor of a vehicle; and
    a magnetic body provided on the floor,
    the detection system detecting that the seat is at a predetermined position when the magnetic body is positioned beside the sensor as the seat slides,
    wherein the detection system further comprises:
    a non-magnetic body that is connected to the magnetic body, the non-magnetic body being positioned beside the sensor when the seat is at a position other than the predetermined position.

2. A sliding seat position detection system according to claim 1, wherein said non-magnetic body is an elongate strip and the magnetic body is connected to a portion of the elongate strip.

3. A sliding seat position detection system according to claim 1, wherein said non-magnetic body is made of resin.

4. A sliding seat position detection system according to claim 1, wherein said sensor includes a channel defined therein, and said magnetic and non-magnetic members extend in said channel as the seat slides on the vehicle floor.

5. A sliding seat position detection system according to claim 4, wherein said channel opens downward.

6. A sliding seat position detection system according to claim 1, wherein said sensor includes a magnetic body sensor, and one of said magnetic and non-magnetic members are positioned in facing relation to said magnetic body sensor at every position of the sliding seat.

* * * * *